June 12, 1956  E. C. GROGAN  2,749,927
CONTROLLER

Filed Dec. 28, 1950  8 Sheets-Sheet 2

*INVENTOR.*
EDWARD C. GROGAN
BY
*Arthur H. Swanson*
ATTORNEY

FIG. 4

INVENTOR.
EDWARD C. GROGAN
BY
Arthur H. Swanson
ATTORNEY.

INVENTOR.
EDWARD C. GROGAN

June 12, 1956

E. C. GROGAN 2,749,927

CONTROLLER

Filed Dec. 28, 1950

INVENTOR.
EDWARD C. GROGAN

BY Arthur H. Swanson

ATTORNEY

June 12, 1956 — E. C. GROGAN — 2,749,927
CONTROLLER
Filed Dec. 28, 1950 — 8 Sheets-Sheet 7

*INVENTOR.*
EDWARD C. GROGAN
BY Arthur H. Swanson
ATTORNEY

June 12, 1956  E. C. GROGAN  2,749,927
CONTROLLER

Filed Dec. 28, 1950  8 Sheets-Sheet 8

INVENTOR.
EDWARD C. GROGAN
BY
*Arthur H. Swanson*
ATTORNEY.

United States Patent Office 2,749,927
Patented June 12, 1956

2,749,927

CONTROLLER

Edward C. Grogan, Philadelphia, Pa., assignor to Minneapolis-Honeywell Regulator Company, Minneapolis, Minn., a corporation of Delaware Application December 28, 1950, Serial No. 203,146

10 Claims. (Cl. 137—86)

This invention relates to fluid-pressure-operated controllers adapted for either manual or automatic operation under the control of either a manually operable transmitting instrument or of an automatically operable measuring instrument, which instruments may be located adjacent the controller or remote therefrom.

It is an object of this invention to provide a controller which, because of its novel and simple construction, gives improved and accurate control action.

More specific objects of this invention are to provide a controller having one or more of the following novel features.

The controller is responsive to one fluid pressure (herein called the "measured variable" pressure) which pressure is proportional to the measured variable and to another fluid pressure (herein called the "set point" pressure) which pressure is manually adjustable to vary the value of the controlled variable which, at any instant, the automatic controller tends to maintain. A plate is adjustable to reverse the connections between the controller and the "set point" pressure and between the controller and the "measured variable" pressure so as to reverse the directions in which these pressures actuate the controller.

The controller contains a control-exercising element, such as a flapper valve and a cooperating nozzle. This control-exercising element regulates a third fluid pressure (herein called the "controller output" pressure). The controller output pressure is fed through a manually adjustable restriction which introduces a time delay and reduces the controller output pressure to a fourth fluid pressure (herein called the "reset" pressure). This reset pressure is applied to the motor or control chamber of a relay. The output chamber of this relay has an inlet valve connected to a source of fluid and an outlet valve connected to an exhaust to atmosphere. One conduit connects the controller output pressure to a manually adjustable restriction. This restriction adjusts the throttling range or proportional band of the controller. This conduit continues to a motor or operating chamber which operates the control-exercising element in the same direction as the deviation between the measured variable pressure and the set point pressure. A second conduit connects the output chamber of said relay to said motor and contains a fixed restriction.

The capacity of this motor chamber and the portions of the conduits leading to said fixed restriction and to said manually adjustable restriction is critical, i. e., the volume in which a fifth fluid pressure (herein called the "positive feedback" pressure) is developed is critical because the time delay of the controller is a function of this volume and of the fixed restriction. In order to reduce this time delay without the use of a fixed restriction of excessive size the volume of the positive feedback motor chamber is held to a minimum. This is done by the interposition of a relay having a ratio of one-to-one (as nearly as can be held under commercial manufacturing tolerances). The input or motor chamber of this relay is connected between said manually adjustable restriction and said fixed restriction. The output chamber of this relay contains an inlet valve for connection to a source of fluid supply pressure, an exhaust valve leading to atmosphere, and a connection to the positive feedback of motor chamber. The response in controller output pressure to sudden changes in deviation between the measured variable pressure and the set point pressure is thereby improved.

Drawings

The figures constituting the drawings are as follows.

General description

Figure 1:
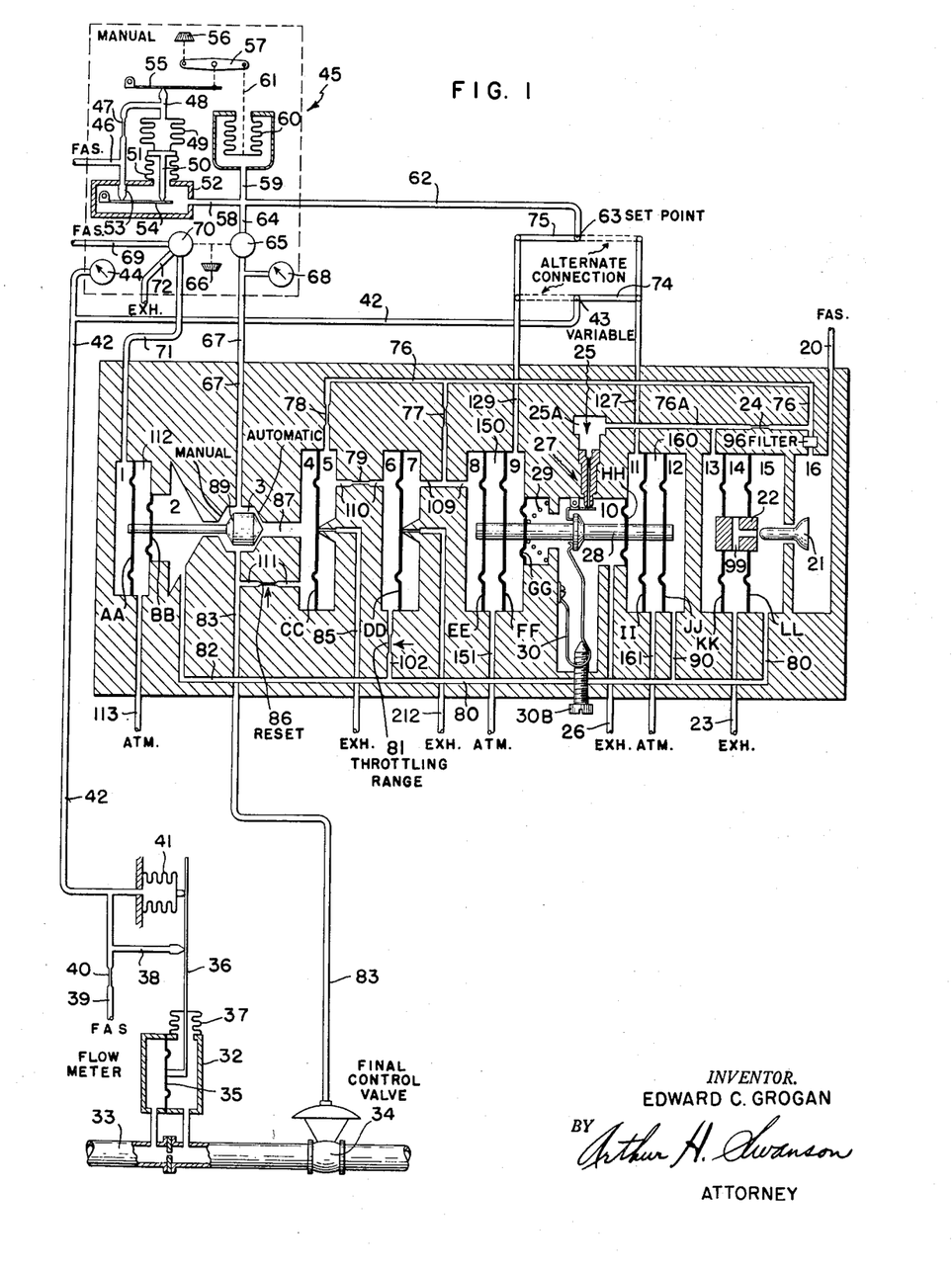
Fig. 1—Schematic diagram with parts in longitudinal cross section.

Fig. 1 shows that the device of this invention is a controller adapted to be actuated by a fluid, usually air. A filtered air supply (hereinafter and in the drawings FAS) is connected through conduit 20 to chamber 16. An inlet valve 21 controls the supply of air from chamber 16 to the valve chamber 15. An exhaust valve 22 cooperates with the inner end of inlet valve 21 to permit the exhaust of air from chamber 15 to chamber 14 and port 23 to atmosphere. Chamber 16 is also connected through a fixed restriction 24 to motor chamber 13, and, through nozzle generally indicated at 25, to valve chamber 10 which is exhausted to atmosphere through port 26. Pivotally mounted in chamber 10 is a valve, generally indicated at 27, adapted to cooperate with the inwardly projecting end of nozzle 25 so as to vary the flow of fluid therethrough. A valve actuating member, generally indicated at 28, contacts valve 27 so as to actuate it. A conical spring 29 stresses member 28 in one direction and a U-shaped spring 30 (Fig. 24) stresses it in the opposite direction. A manually operable member 30B varies the bias of spring 30 on member 28 so that the bias of spring 30 may be more than or less than the bias of spring 29. In other words, member 28 may be biased to the right or to the left as seen in Fig. 1.

The controller is arranged to be responsive to a measuring instrument, disclosed as a flow meter 32 responsive to the flow of fluid through a conduit 33. Of course, any type of measure instrument which is capable of converting a measured variable into an air pressure may be employed. The controller controls the actuation of a final control valve 34 in conduit 33 or, is otherwise arranged to vary a quantity or condition so as to affect the value of the controlled variable of the process under control.

Flow meter 32 has a diaphragm 35 which rocks a flapper lever 36 about a supporting, sealing bellows 37 so that the flapper lever 36 varies the flow of fluid from a nozzle 38 supplied with air from a source 39 through a restriction 40. The variations caused by the variations in flow through nozzle 38 are applied to a follow-up bellows 41 so as to restore the flapper lever 36 to its original position. Air pressure proportional to the value of the variable measured by the measuring instrument 32 is fed through pipe 42 to an inlet port 43 and to a gauge 44.

A remotely located, manually operable, fluid pressure transmitting instrument is contained within the casing 45 and is connected to a supply of air 46. A restriction 47 transmits air to a nozzle 48 and a motor bellows 49 having a free end secured to a T-shaped exhaust port 50, connected by a sealing bellows 51 to a casing 52. A nozzle 53 is connected to source 46 and projects into the casing 52 so as to cooperate with flapper 54. A second flapper 55 is pivotally mounted adjacent nozzle 48 and is adapted to be moved by a manually operable handle 56 through a differential lever 57.

The air pressure thus set up under the control of handle 56 escapes from casing 52 by pipe 58 which has a branch 59 leading to a follow-up bellows 60 having a mechanical connection 61 forming another input to differential lever 57 so as to restore flapper 55 to its original position.

Pipe 58 also has a branch 62 which leads to a second inlet port 63. Pipe 58 has a third branch 64 which leads through one set of ports 65 of a valve which is manually operable by handle 66. The opposite side of valve 65 is connected to a branched pipe 67 containing gauge 68 and terminating in the controller in chamber 3.

Another source of fluid pressure 69 communicates with a second valve section 70 having an outlet port connected to a pipe 71 which terminates in the controller at chamber 1. A second output port of valve 70 connects to an exhaust port 72. The ports of valve section 65 are arranged so that communication is established between pipes 64 and 67 when valve section 70 is set to establish communication between pipe 71 and exhaust 72 so that there is no pressure in chamber 1 and the valve in controller chamber 3 is in the left hand or manual position. When the ports of valve section 70 are set by handle 66 to establish communication between supply 69 and conduit 71 so that supply pressure is supplied to control chamber 1, the valve in chamber 3 is in the right-hand or automatic position while the air pressure under the control of manually operable handle 56 is shut off by the valve section 65.

Figures 19, 20, 21, 22, 23, 24, 25:
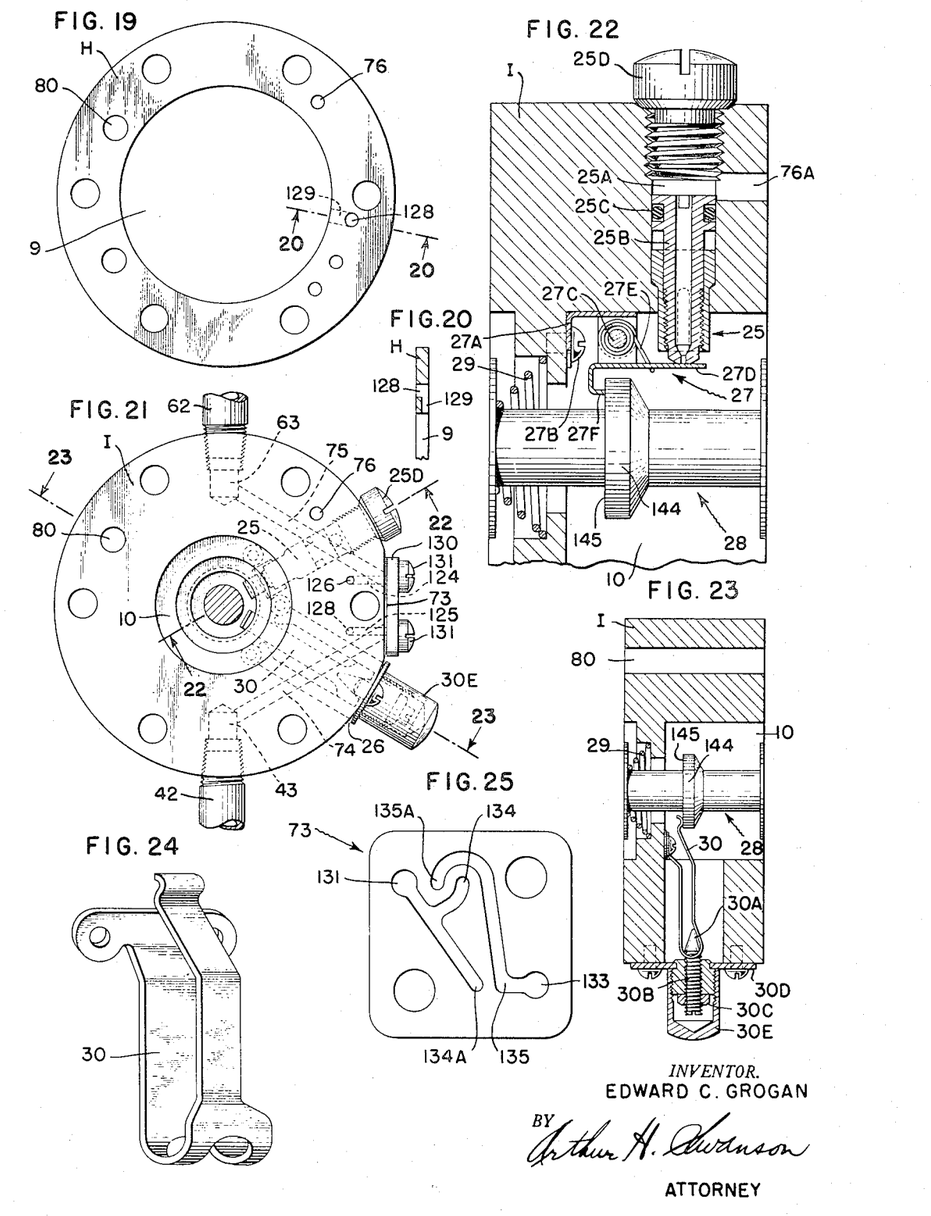
Fig. 19—End view of ring H.
Fig. 20—Longitudinal cross section from Fig. 19 on line 20—20.
Fig. 21—End view of ring I.
Fig. 22—Longitudinal cross section from Fig. 21 on line 22—22 on an enlarged scale.
Fig. 23—Longitudinal cross section from Fig. 21 on line 23—23.
Fig. 24—Perspective view of spring 30.
Fig. 25—Face or plan view of pneumatic switch 73.

Figs. 21, and 25 show that ports 43 and 63 terminate beneath a plate 73 which may be connected to the controller casing in either of two positions. In the position shown in full lines in Fig. 1, plate 73 contains conduit 74 connecting port 43 with chamber 11 while conduit 75 connects port 63 with chamber 9. In such a position chamber 11 is thus subject to the air pressure which is proportional to the variable measured by the measuring element 32 while chamber 9 is subjected to the pressure which is proportional to the pressure which is manually established by handle 56 which thus sets the point from which the deviations of the measured variable are measured. A more complete description of the actual construction of these ports and conduits is given below.

Conduit 76 connects chamber 16 with chamber 7 and 8 through restriction 77 and connects chamber 16 with chamber 5 through restriction 78. Chambers 5 and 6 are connected by a conduit containing restriction 79.

The regulated fluid pressure established in chamber 15 by the operation of the controller passes through conduit 80 and manually adjustable restriction 81 to chamber 6. This air also passes through conduits 80, 82, chambers 2 and 3, and conduit 87 to chamber 4.

Chamber 3 is connected by conduit 83 to the final control valve 34. Conduit 111 containing a manually operable restriction 86 connects conduit 83 to chamber 4 in parallel with conduit 87.

Operation of controller

Fig. 1 shows the variable fluid pressure inlet port 43 connected through conduit 74 to chamber 11 and the set point fluid pressure inlet port 63 connected through conduit 75 to chamber 9. Also in Fig. 1, valve 89 in chamber 3 is assumed to be in the right-hand or automatic position. If the measured variable flow through pipe 33 varies, diaphragm 35 causes flapper lever 36 to vary the fluid pressure escaping through nozzle 38. This variation in the fluid pressure from source 39 in pipe 42 causes bellows 41 to give a follow-up movement to flapper lever 36 and thus restore it to its original position. This variation in fluid pressure is also transmitted through pipe 42, inlet port 43, and conduit 74, to chamber 11. From source 46 fluid pressure passes under the control of manually operable handle 56 through pipes 58, 62, inlet port 63, and conduit 75 to chamber 9. There is thus established in chamber 9 a fluid pressure which actuates the valve-actuating member 28 in the opposite direction to the pressure in chamber 11. Any difference in the pressure in chamber 11 from that in chamber 9 causes rod 28 to move flapper 27 with respect to nozzle 25. This varies the pressure in chambers 25A and 13 and causes inlet valve 21 or exhaust valve 22 to be opened so as to admit air to or exhaust air from chamber 15, which therefore contains an air pressure regulated by the controller. This air pressure from chamber 15 is transmitted through conduits 80 and 90 to chamber 12 where it causes a follow-up movement of rod 28 and flapper 27. This variation in pressure is also transmitted from chamber 15 through conduit 80 and variable restriction 81 to chamber 6 where it varies the pressure applied to diaphragm DD and thus varies the pressure in chamber 8 and gives a throttling range adjustment to rod 28, and consequently to flapper 27. This variation in pressure in chamber 15 also passes through conduits 80, 82, and chambers 2 and 3. Since valve 89 closes conduit 87 this pressure chamber passes through conduits 83 and 111 and adjustable restriction 86 to chamber 4. A variation in pressure in chamber 4 moves diaphragm CC and thereby varies the pressure applied from chamber 5 through restriction 79 to chamber 6 which in turn influences the pressure in chamber 8 and actuates rod 28 and consequently flapper 27 with a reset action.

If it is desired to actuate the controller and consequently the final control valve 34 manually instead of automatically by means of measuring element 32, handle 66 is shifted so that communication is shut off by valve section 70 between source 69 and conduit 71 to chamber 1. Communication is opened from chamber 1 through conduit 71, valve section 70, and port 72 to exhaust. This reduces the pressure in chamber 1 and causes valve 89 to shift because of its bias (not shown) from the right-hand or automatic position of Fig. 1 to the left-hand or manual position. With valve 89 in the left-hand or manual position, adjustment of handle 56 varies the air pressure put out from relay casing 52 through conduits 58, 64, valve section 65, conduit 67, chamber 3, and a conduit 83, to final control valve 84. This air pressure is also applied from chamber 3 through conduit 87 to chamber 4 where it serves to adjust the instantaneous position of flapper 27 so that it is in proper proportion to the setting of the final control valve 34.

Detailed description of controller

Figure 2:
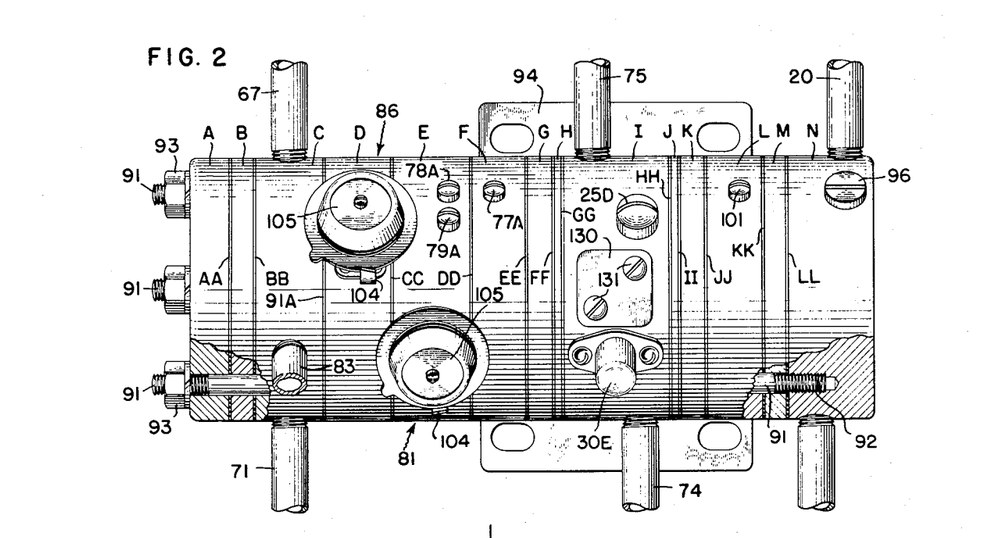
Fig. 2—Front elevation with parts broken away in longitudinal cross section, showing the controller formed of a number of parts A, B, C, D, E, F, G, H, I, J, K, L, M, and N.
Figure 3:
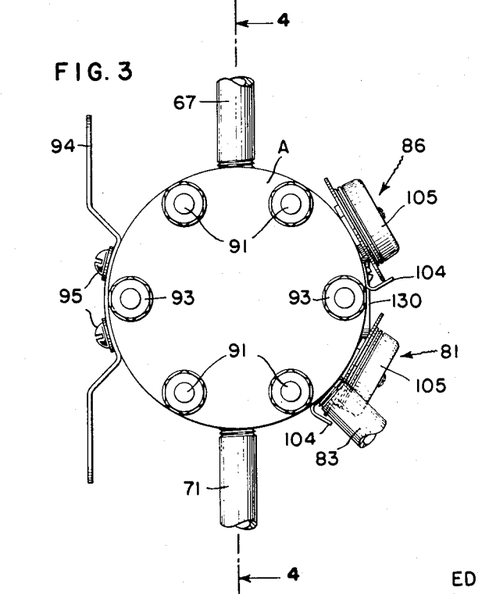
Fig. 3—End view as viewed from the left of Fig. 2.
Figure 4:
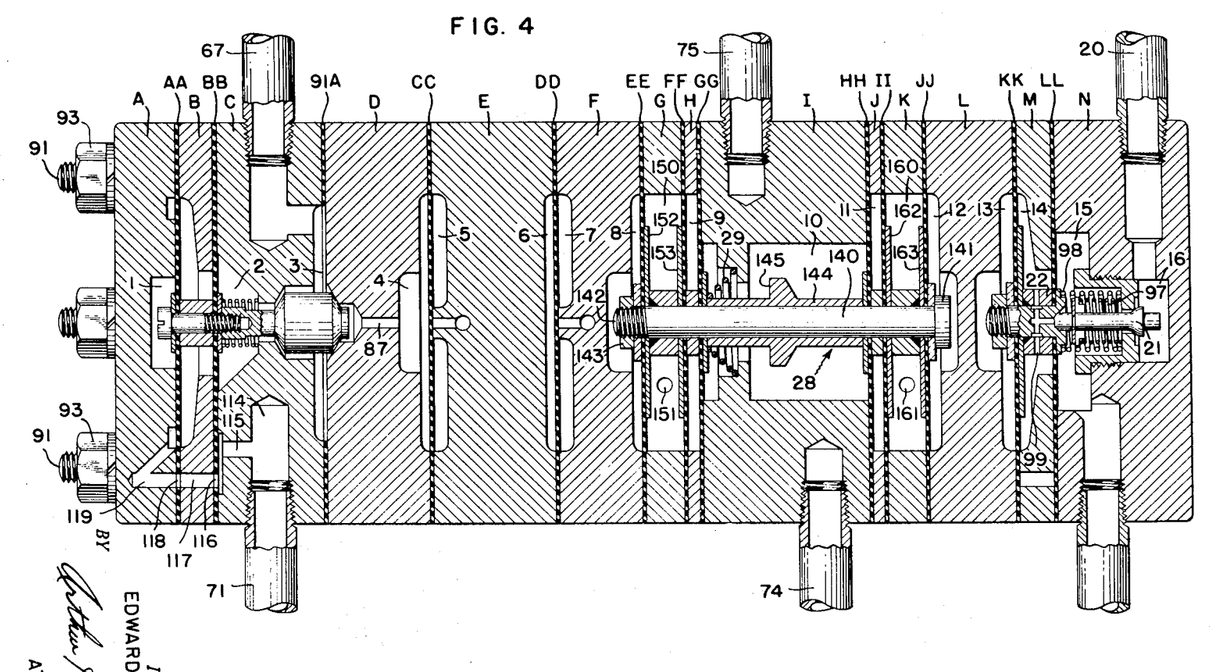
Fig. 4—Longitudinal cross section taken from Fig. 3 on line 4—4 showing the chambers 1–16 and the diaphragms AA–LL.

Referring to Figs. 2, 3, and 4, it will be seen that this controller is composed of a plurality of parts, of generally disc or cylindrical shape, and numbered respectively A, B, C, D, E, F, G, H, I, J, K, L, M, and N. The parts A–N are separated by the diaphragms AA, BB, CC, DD, EE, FF, GG, HH, II, JJ, KK, and LL. Parts C and D are sealed by a gasket 91A (Fig. 4). The parts A–N are secured together by a plurality of bolts 91 which are attached by means of screw threads 92 to part N and which are held in position at their outer ends by nuts 93. The controller may be held at any convenient position by a mounting plate 94 secured to the controller by screws 95 (Fig. 3).

Pressure regulating pilot valve or relay

Figures 34, 35:
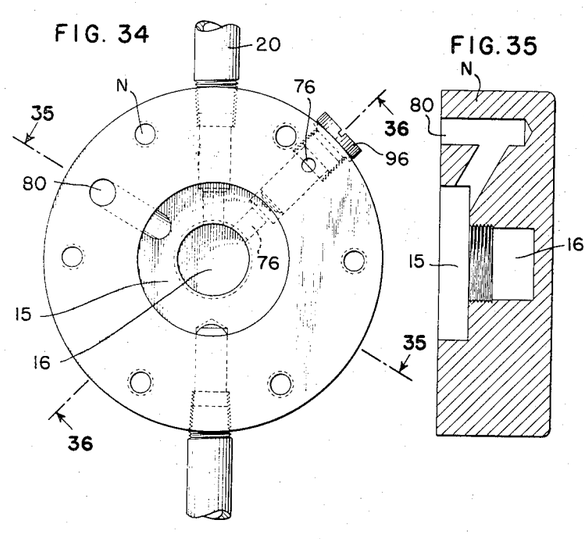
Fig. 34—End view of ring N.
Fig. 35—Longitudinal cross section from Fig. 34 on line 35—35.
Figure 36:
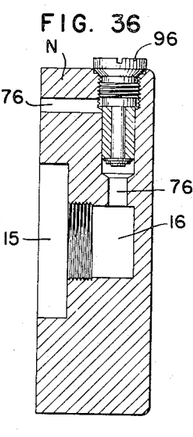
Fig. 36—Longitudinal cross section from Fig. 34 on line 36—36.

Figs. 1, 4, 35, and 36 show that a supply of filtered air is connected through pipe 20 to chamber 16 with which conduit 80 communicates (Fig. 35). Conduit 76 also communicates with chamber 16 by means of a filter 96 so that the supply of air from chamber 16 to restrictions 24, 77, and 78, and to nozzle 25, is filtered.

Fig. 4 shows that part N also contains chamber 15 to which air is admitted from chamber 16 through inlet valve 21 which is stressed towards the left by spring 97. Diaphragm LL separates chamber 15 from chamber 14. Spring 98 stresses outlet valve 22 to the left as seen in Figs. 1 and 4. Outlet valve 22 is supported on diaphragms KK and LL and contains a T-shaped exhaust port 99 in it.

Figures 26, 33:
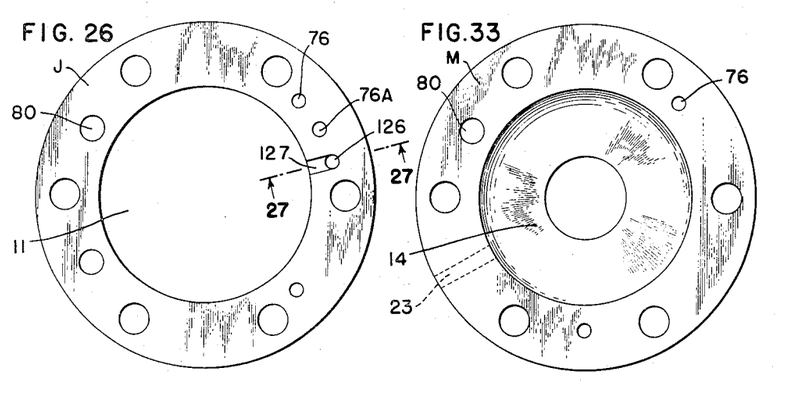
Fig. 26—End view of ring J.
Fig. 33—End view of ring M.

Sheet 7, Fig. 33, shows the exhaust port 23 from chamber 14 to the atmosphere.

Figure 32:
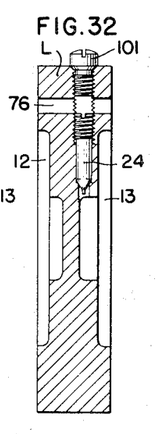
Fig. 32—Longitudinal cross section from Fig. 29 on line 32—32.

Figs. 1, 4, and 29–32 (sheet 7), shows that chamber 13 is formed between part L and diaphragm KK. Figs. 36, 33, 32, and 29 show that conduit 76 passes from chamber 16 through holes (not shown) in diaphragms KK and LL to chamber 13. Figs. 1 and 32 show that communication is established between chamber 13 and conduit 76 by means of restriction 24.

Restrictions 24, 77, and 78

Figures 11, 12, 13, 14, 15, 16, 17, 18:
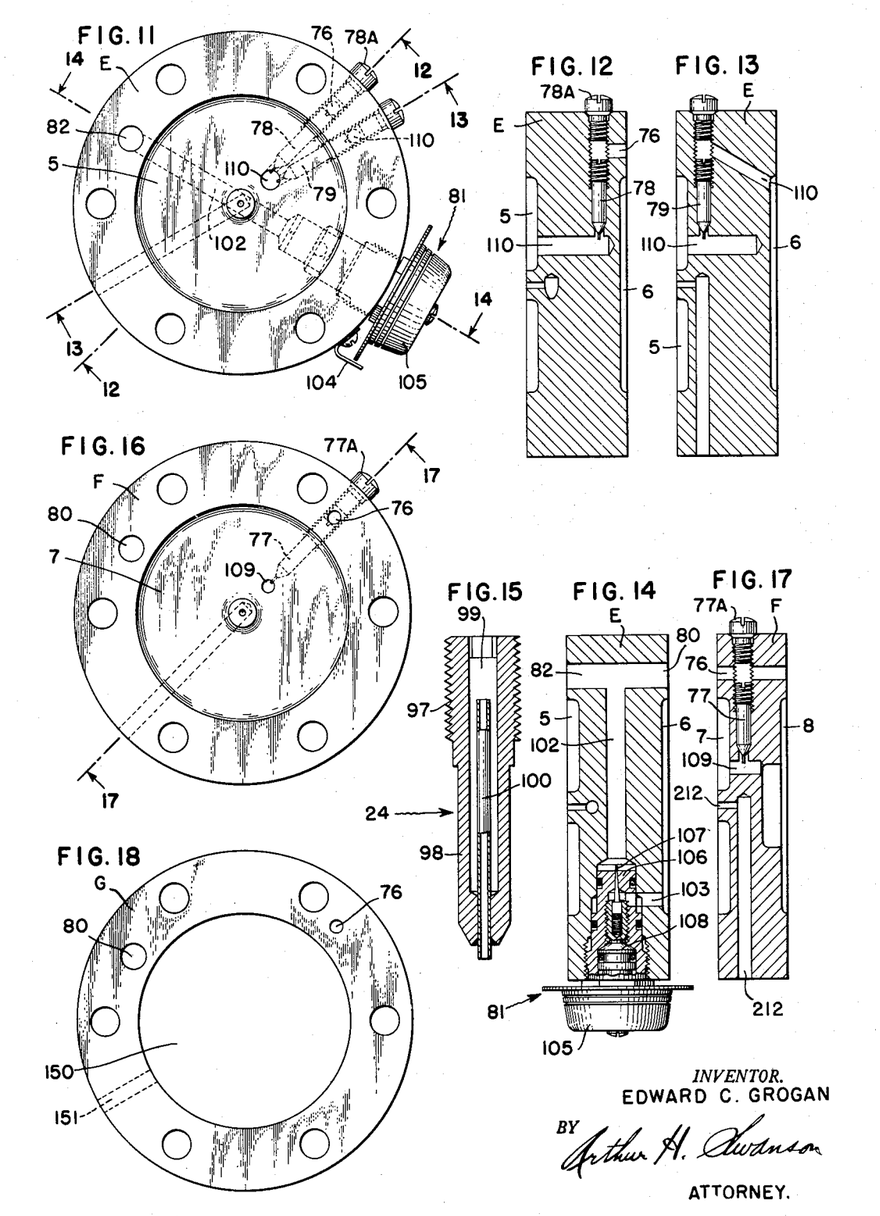
Fig. 11—End view of ring E.
Fig. 12—Longitudinal cross section from Fig. 11 on line 12—12.
Fig. 13—Longitudinal cross section from Fig. 11 on line 13—13.
Fig. 14—Longitudinal cross section from Fig. 11 on line 14—14.
Fig. 15—Longitudinal cross section on an enlarged scale of resistance screw 24.
Fig. 16—End view of ring F.
Fig. 17—Longitudinal cross section from Fig. 16 on line 17—17.
Fig. 18—End view of ring G.

Restriction 24, as well as restrictions 77 and 78, are of the type shown on an enlarged scale in Fig. 15. Figs. 32 and 15 show that part L has a radially extending, screw threaded hole in it. Into this hole fit screw threads 97 on the outer tubular body of restriction 24, which has a tubular portion 98 of reduced size and an inner cavity or counterbore 99 into which is fitted a tube 100 of small cross section which forms the restriction proper. The outer end of this hole or bore beyond conduit 76 is closed by a screw-threaded plug 101.

Figs. 29, 28, 26, and 22 show that conduit 76A continues to the left from chamber 13 through part L, diaphragm JJ, part K, diaphragm II, part J, chamber 11, conduit 76A, diaphragm HH, and part I to nozzle chamber 25A in part I (Fig. 22).

Fig. 22 shows nozzle chamber 25A extending radially of part I at the end of conduit 76A. The nozzle, generally indicated at 25, consists of an inner tubular member 25B having flanges adjacent its upper or outer end to receive a sealing ring 25C. The inner end of nozzle 25 which projects into chamber 10 has an inner bore of small area through it. The outer end of chamber 25A is sealed with a plug 25D.

Fig. 22 also shows that there is mounted in chamber 10 a flapper, generally indicated at 27, and comprising an L-shaped bracket 27A secured to part I by screw 27B and having a transversely extending portion 27C on which the flapper 27D is pivoted. A spring 27E biases the flapper 27D into engagement with the end of nozzle 25. Flapper 27D has a short leg 27F which engages the valve-actuating member 28 as will be more fully described hereinafter.

Returning to Figs. 1–4, 32, 29, 28, 26, 21, 19, 18, 17, 16, 11, and 12 show that conduit 76 passes from chamber 16 to chambers 7 and 8 (through restriction 77) and to chamber 5 through restriction 78.

Restrictions 77 and 78 may be identical with restriction 24 (shown in Fig. 15) and are located in radially extending cavities in parts E and F respectively. The outer ends of these cavities are closed by screw threaded plugs 77A and 78A.

Figs. 1, 4, 34, 35, 33, and 29, show that chamber 15 is connected to chamber 12 by conduits 80 and 90. Figs. 29 and 31, 28, 26, 21, 23, 19, 18, 16, 11, 14, 7, and 8 show that chamber 15 is connected by means of conduits 80 and 82 with chamber 2.

Variable restrictions 81 and 86

Fig. 14 shows that at the junction of conduits 80 and 82 there is an adjustable restriction, generally indicated at 81, which controls the passages 102 and 103, to chamber 6. Restriction 81 is the throttling range restriction. Figs. 11 and 14 show that it is located in a radially extending cavity at the end of 102. An indicator 104 is mounted on the outside surface of part E adjacent an operating handle 105. Conduit 102 is sealed from conduit 103 by a needle plug 106 having a perforation through it in which is mounted a needle valve 107 secured at one end of a needle valve screw 108 which is fastened to handle 105 so that rotation of handle 105 adjusts the amount of opening between needle 107 and the adjacent cylindrical opening in needle plug 106.

Figure 9:
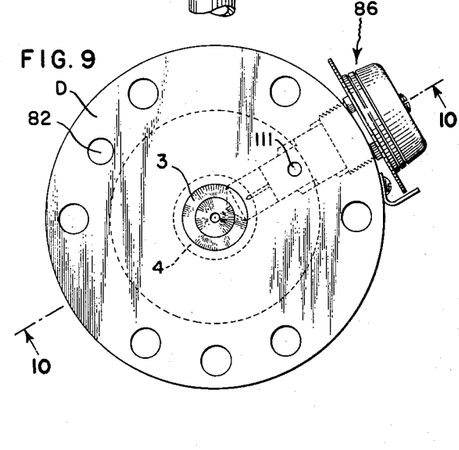
Fig. 9—End view of ring D.
Figure 10:
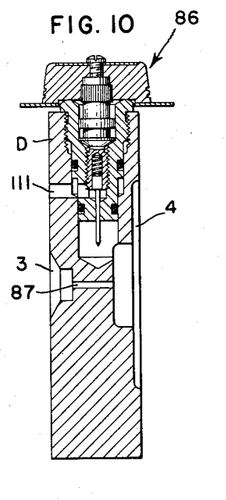
Fig. 10—Longitudinal cross section from Fig. 9 on line 10—10.

Parts E and F, chambers 6 and 7, and diaphragm DD form a one-to-one relay. Fig. 17 shows that chambers 7 and 8 are in open communication through an unrestricted conduit 109 which communicates with the opposite side of restriction 77 from that connected to conduit 76. Figs. 1 and 13 show that chambers 5 and 6 are connected by a conduit 110 in which is located restriction 79 which may be identical with restriction 24 (Fig. 15). Figs. 9, 10, 7, and 8 show that chamber 3 (which communicates with pipe 83) is connected with chamber 4 through a conduit 111 in which is located manually adjustable restriction, generally indicated at 86. Figs. 9 and 10 show that restriction 86 may be identical with restriction 81 except that in restriction 86 the needle is cylindrical instead of being conical as is the needle 107 of restriction 81. Restriction 86 is the reset adjustment.

Figure 6:
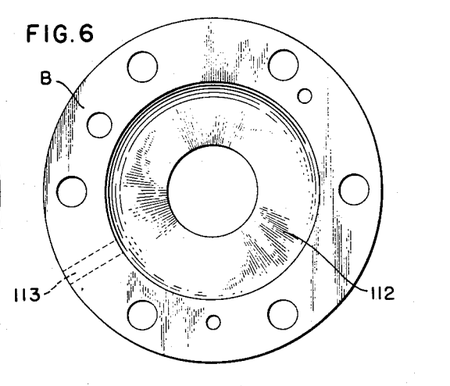
Fig. 6—End view of ring B.

Fig. 6 shows part B which has a diaphragm sealing cavity 112 in it open to atmosphere through exhaust port 113.

Figure 5:
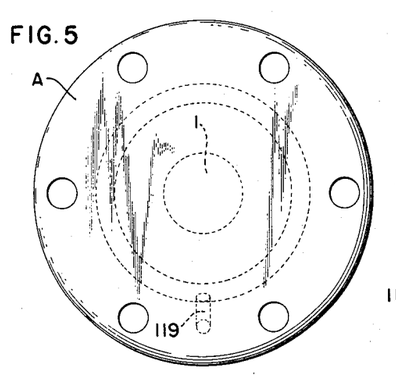
Fig. 5—End view of ring A.
Figure 7:
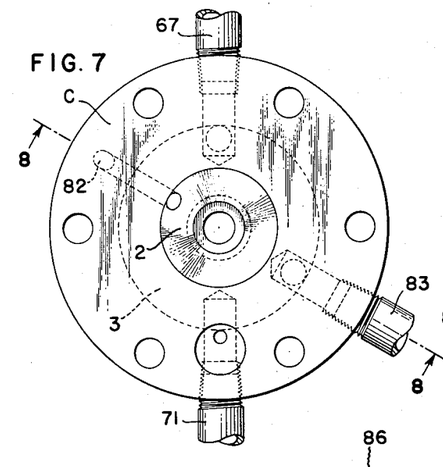
Fig. 7—End view of ring C.
Figure 8:
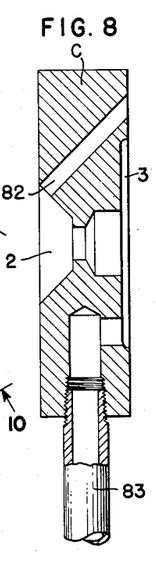
Fig. 8—Longitudinal cross section from Fig. 7 on line 8—8.

Fig. 5 shows part A having motor cavity 1 in it to which air is adapted to be supplied from pipe 71, as is seen in Figs. 7, 4, and 5, which show that pipe 71 fits into a radially extending cavity 114 in part C which communicates with a transversely extending cavity 115 communicating with a hole 116 in diaphragm BB, a hole 117 in part B, a hole 118 in diaphragm AA, and a fish hook shape hole 119 in part A communicates with chamber 1 therein.

*Switch plate for change from direct to reverse action*

Figure 27:
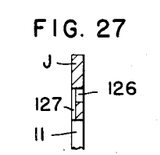
Fig. 27—Longitudinal cross section from Fig. 26 on line 27—27.
Figure 28:
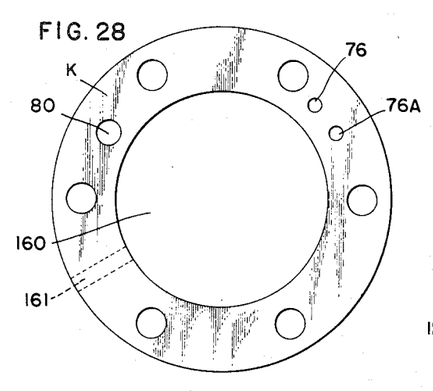
Fig. 28—End view of ring K.
Figure 29:
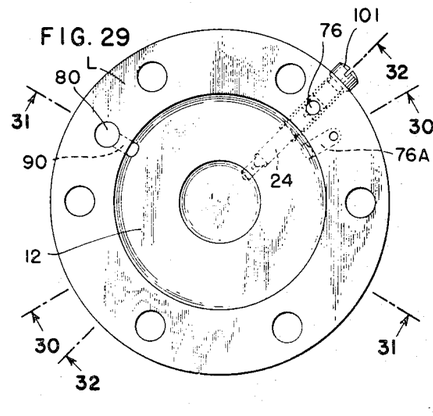
Fig. 29—End view of ring L.
Figures 30, 31:
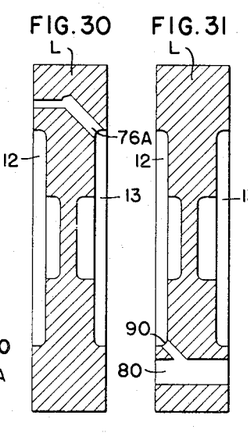
Fig. 30—Longitudinal cross section from Fig. 29 on line 30—30.
Fig. 31—Longitudinal cross section from Fig. 29 on line 31—31.
Figure 37:
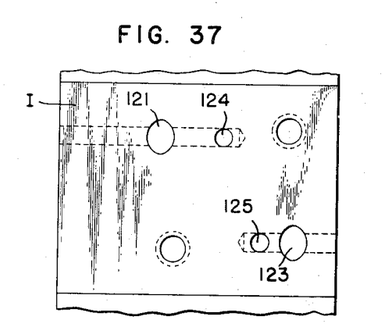
Fig. 37—Face or plan view of a portion of the outside edge of part I on the same scale as Fig. 25.

Figs. 1, 4, 21, 25, and 37 show the plate 73. Figs. 21 and 37 show that conduit 62 terminates in inlet port 63 which communicates by conduit 75 with a port 121 in the outer surface of part I. Similarly, conduit 42 terminates in inlet port 43 which communicates by means of conduit 74 with port 123 in the outer surface of part I. Part I also has two cavities 124 and 125 extending inward radially thereof, a short distance. Cavity 124 has, at its inner end, a transversely extending conduit 126 which communicates through gasket HH with a transversely extending port 126 (Figs. 26 and 27) having an inwardly extending portion 127 which communicates with chamber 11. Port 125 likewise has at its inner end a transversely extending port 128 which extends through an opening in gasket GG to port 128 in parts H which communicates through a radially extending port 129 with chamber 9 (Figs. 19 and 20). Figs. 21 and 25 show that plate 73 is adapted to be secured against the outer surface of part I which is shown in Fig. 37, by means of a flat cover 130 and screws 131. Plate 73 has an irregularly shaped perforation 131 adapted to overlie port 121. Perforation 131 communicates with perforation 134 which overlies port 124 so that port 131 is connected to port 134 and consequently set point pressure port 63 is connected with chamber 9. Plate 73 also has a perforation 133 which is connected with a perforation 135. In the position shown, perforation 133 overlies port 123 while perforation 135 overlies port 125. Consequently, there is an open communication between port 123, perforations 133 and 135, and port 125, thus the variable pressure inlet port 43 is connected to chamber 11.

Plate 73 can change operation of the controller from direct to reverse operation, that is, it is possible to change the operation of a controller from one in which the output pressure varies in the same direction as the input pressure to one in which the output pressure varies in the reverse direction to the input pressure. This switch from direct to reverse operation is accomplished by rotating plate 73 one hundred and eighty degrees from the position in which it is shown in Fig. 25. In this reverse position, perforation 133 overlies perforation 121 and perforation 135A overlies perforation 125 so that set point pressure inlet port 63 is connected to chamber 11. In this reverse position, perforation 131 overlies perforation 123 and perforation 134A overlies port 124. Thus, the variable pressure inlet port 43 is connected to chamber 9.

Plate 73 and cover 130 may be modified by making the perforations 131, 133, 134, 135, 134A, and 135A simple holes and by forming the innerface of the cover 30 with corrugations of the shape shown in Fig. 25. This modification operates in exactly the same manner described.

*Valve actuating rod 28 and spring bias applied thereto*

Figs. 1 and 4 show that the member, generally indicated at 28, which actuates the flapper generally indicated at 27, is supported in chambers 8, 9, 10, 11, and 12 by means of gaskets EE, FF, GG, HH, II, and JJ.

Member 28 consists essentially of a bolt 140 having a head 141 and a screw threaded end 142 to which a nut 143 is secured. The central portion of bolt 140 has a tube 144 slid over it. Tube 144 is provided with a boss having a flat, radially-extending face 145 which engages with the short leg 27F of valve 27 (Fig. 22). Fig. 23 shows a generally conical, helical spring 29 which stresses member 28 to the left as shown in the drawings. A generally U-shaped spring 30 engages face 145 of boss 144 and stresses member 28 to the right. The lower bight of spring 30 is engaged by the conical end 30A of a screw 30B which is adjustable and which is secured in adjusted position by means of a locknut 30C. Screw 30B extends through a plate 30D forming one wall of chamber 10 and part I. A cap 30E very similar to the valve stem cap of an automobile tire encloses the outer end of stem B. Since the outer wall of part I is cylindrical while plate 30D is flat, there is a leak around the edge of plate 30D which provides the exhaust 26 to atmosphere from chamber 10.

By adjustment of screw 30B, the bias which spring 30 exerts to the right of member 28 may be adjusted to be more or less than the bias which spring 29 exerts to the left. Thus, the position of balance or rest, which the valve-actuating member 28 and its associated parts tend to assume when the pressures applied to it are equal, may be adjusted by screw 30B.

*Means to maintain diaphragm areas substantially constant*

Figs. 1, 4, 18, and 28 show that diaphragm EE, part G and diaphragm FF define a chamber 150 which is vented to atmosphere through a port 151 and that diaphragm II, part K, a diaphragm JJ define a chamber 160 which is vented to atmosphere through a port 161. In chamber 150 between the valve-actuating member 28 and diaphragm EE and FF are reenforcement plates 152 and 153. In chamber 160 between valve-actuating member 28 and diaphragms II and JJ are reenforcement plates 162 and 163. These plates aid in preventing the diaphragms from distorting despite the differences in pressures applied to the opposite sides thereof and therefore aid in maintaining the accuracy of the controller. The diaphragms AA, BB, EE, FF, II, JJ, KK, LL, are always operated on one side of their flat position. In other words, these diaphragms do not move from a bowed or arched position in one direction to a bowed or arched position in the other direction. If such a movement did occur the effective areas of the diaphragms would vary and would consequently introduce inaccuracies in the operation of the controller.

*Throttling range or proportional band adjustment*

The throttling range restriction 81 and the cooperating fixed restriction 79 are designed to produce a narrowing of the proportional band or throttling range as the deviation from the control point increases in either direction. This action is desirable since it materially improves the speed of controller response without causing instability or hunting.

For very small differences in pressure between a point in conduit 80 and a point in chamber 5, the action of the restrictions 79 and 81 is to cause the controller to operate at a proportional band expressible by the following mathematical relationship:

Proportional band equals fixed band multiplied by $$\frac{R_{81}}{R_{81}+R_{79}}$$

where the fixed band is a constant determined by other components of the controller and the expressions $R_{81}$ and $R_{79}$ are the resistances to air flow of the restrictions 81 and 79, respectively.

From this expression it can be seen that, if $R_{81}$ is increased, the proportional band is widened, and, if $R_{81}$ is decreased, the band is made narrower. Conversely, if $R_{79}$ is increased, the band narrows, and, if $R_{79}$ is decreased, the band widens. Restriction 81 is a manually adjustable restriction for setting the desired proportional band. Restriction 81 is also designed so that its resistance automatically reduces in value from the set value as the difference between the pressures in 80 and 5 increases numerically (i. e. as the deviation from the set point increases numerically). Then the operating band will be temporarily narrowed and the controller resistance will be improved. The same effect can be produced if restriction 79 is made to increase in resistance as the deviation from set point or difference between pressures in 80 and 5 increases numerically.

The most convenient way of obtaining this action is to design the fixed restriction 79 as a capillary tube similar to the fixed restriction 24 (Fig. 15) so proportioned that, as the difference between the pressures at 80 and 5 increases, the flow through the fixed restriction 79 changes from a laminar or viscous nature to a turbulent nature. It can be shown mathematically and experimentally that the transition from laminar to turbulent flow results in higher values of resistance $R_{79}$, thus narrowing, the proportional band while the deviation from the set point is large. As the controller returns the process variable to the set point, the difference between the pressures at 80 and 5 is reduced and the proportional band returns to the previously set value.

By designing the variable restriction 81 as a tapered, variable, annular restriction (i. e. by providing restriction 81 with a conical needle valve 107 (Fig. 14)), the resistance to air flow of restriction 81 can be made to stay within the laminar or viscous range for all values of flow encountered within the range of controller operation. Thus, the undesirable effect of having the flow through the restriction 81 become turbulent and cause a widening of a proportional band is prevented.

An additional feature of this narrowing of the proportional band as the deviation increases numerically is that it offsets an undesirable widening of the band which results when the pressure in conduit 80 drops below the pressure in chamber 5, this widening being caused by the compressibility of air.

*One-to-one relay*

The pressure divider circuit used for the proportional band adjustment causes a time lag in the overall resistance of the controller. This time lag is a critical function of the volume of that chamber which includes a movable wall upon which the positive feedback pressure is fed (i. e. chamber 8).

The inclusion of a one-to-one pneumatic relay between the output chamber 6 of the throttling range adjustment circuit and the positive feedback chamber 8 of the controller permits a considerable reduction in the effective volume included in the positive feedback circuit as compared to that which could otherwise be obtained practically. The response in controller output pressure to sudden changes in deviation between the process variable and the set point pressure is thereby improved considerably.

An additional purpose of this relay is to provide a means for regulating the pressure in chamber 8 so that sudden large motions of the diaphragm assembly will not affect this pressure appreciably.

For the above purposes, a one-to-one relay is employed comprising a motor or driving chamber 6 to which the throttling range adjustment pressure is applied through conduit 102 and variable restriction 81 and to which the reset pressure is applied through conduit 110 and fixed restriction 79. Chamber 6 governs the pressure in chamber 7 to which air is fed from supply 20, conduit 76, restriction 77, a conduit 109 and which has an outlet 212 therefrom controlled by the diaphragm DD. The output of chamber 7 is fed through conduit 109 to the positive feedback chamber 8. The pressure of the air in conduit 76 from supply source 20 is approximately twenty pounds per square inch gauge. Inlet restriction 77 is of suitable size to reduce this inlet pressure so as to give a high capacity characteristic to the one-to-one relay. This relay can supply or exhaust large quantities of air from the controlled chamber 7 and from the positive feedback chamber 8 in a short period of time when responding to changes in the pressure in motor or driving chamber 6. Controlled chamber 7 is distinct from positive feedback chamber 8, although these chambers are connected by a conduit 109 because the air pressure in chamber 7 acts on diaphragm DD while the air pressure in chamber 8 acts on diaphragm EE.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. In a fluid-pressure-controller movable in one direction or the other in response to variations in a measured variable, an output chamber the pressure in which is under the control of said controller, a negative-feedback-pressure chamber having a movable wall mechanically connected to said controller so as to operate it in the opposite direction to that in which said controller is moved by the measured variable, a positive-feedback-pressure chamber having a movable wall mechanically connected to said controller so as to operate it in the same direction as that in which said controller is moved by said measured variable, a first relay having a motor chamber and an outlet chamber having an inlet and an outlet connected thereto under the control of said motor chamber, a first conduit between said output chamber and said motor chamber of said first relay, a first adjustable restriction in said conduit for adjusting the reset rate of said controller, a second relay having a motor chamber and an outlet chamber having an inlet and an outlet connected thereto under the controll of said motor chamber, a connection between the outlet chamber of said first relay and said motor chamber of said second relay, an unrestricted conduit between the outlet chamber of said second relay and said positive-feedback pressure chamber of said controller, a second conduit between said output chamber and said motor chamber of said second relay, and an adjustable restriction in said second conduit for adjusting the proportional band or throttling range of the controller.

2. A controller according to claim 1 having a restriction in the connection between the outlet chamber of said first relay and the motor chamber of said second relay.

3. In an elastic-fluid-pressure-operated controller, a control-exercising element operable in one sense by changes in a measured variable, a conduit having a small capacity for elastic fluid and connected to said element to receive therefrom elastic fluid whose pressure is varied by said element, a negative-feedback elastic-fluid-pressure-operated motor connected to said element so as to move it in the sense opposite to that it is moved by said measured variable, a positive-feedback elastic-fluid-pressure-operated motor connected to said element so as to move it in the same sense as it is moved by said measured variable, said conduit having two sub-conduits, one of said sub-conduits containing an adjustable restriction providing a throttling band adjustment, a first one-to-one relay having a motor chamber and an outlet chamber containing an inlet and an exhaust for elastic-fluid controlled by said motor chamber of said relay, said outlet chamber communicating without restriction with said positive-feedback motor, said motor chamber communicating with said restriction, the other of said sub-conduits containing a second adjustable restriction providing reset adjustment, a second one-to-one relay having a motor chamber and an outlet chamber having an inlet and an exhaust for elastic-fluid controlled by said motor chamber of said relay, said motor chamber of said second relay communicating with said second adjustable restriction, and a second conduit connecting the outlet chamber of said second relay to the motor chamber of said first relay.

4. In a controller for maintaining a regulated fluid pressure, a first fluid-operated motor adapted for connection to a source of fluid pressure varying in response to the controlled variable, a second fluid-operated motor, a control-exercising member connected under the control of said motors so as to be actuated thereby, a first relay adapted to regulate a fluid pressure under the control of said member, a second relay having an input chamber and an output chamber, a first conduit adapted for connection to a source of fluid pressure and to said output chamber and to said second motor, a restriction in said first conduit between said source and said output chamber and said second motor, an outlet port in said output chamber and under the control of the variable pressure in said input chamber, a second conduit between the regulated pressure of said first relay and said input chamber, a manually operable variable restriction in said second conduit, a third relay having an input chamber and an output chamber, a restriction adapted for connection to a source of fluid pressure and to the output chamber of said third relay, a third conduit connecting the output chamber of said third relay and the input chamber of said second relay, a restriction in said third conduit, an outlet port in the output chamber of said third relay under the control of the pressure in the input chamber of said third relay, a fourth conduit connecting the regulated pressure of said first relay and the input chamber of said third relay, and a manually adjustable restriction in said fourth conduit.

5. In an elastic-fluid-pressure-operated controller, a control-exercising valve operable in one sense in response to variations in a measured variable, a conduit having a small capacity for fluid, means controlled by the operation of said valve to admit or exhaust fluid to or from said conduit, a negative-feedback elastic-fluid-operated motor connected to said valve so as to operate it in the opposite sense that it is operated by said measured variable, a positive-feedback elastic-fluid-pressure-operated motor connected to said valve so as to operate it in the same sense as it is operated by said measured variable, a one-to-one relay having a motor chamber connected to said conduit and having an output chamber and having an inlet and an exhaust for elastic-fluid communicating with said output chamber, a conduit of greater cross-section than said inlet or said outlet connecting said output chamber and said positive-feedback motor, and a restriction in said conduit between said means and said motor chamber of said one-to-one relay, said restriction being manually adjustable to change the proportional band of said controller.

6. An elastic-fluid-pressure-actuated controller including, a force-exerting condition-responsive means, a first elastic-fluid-pressure-actuated motor opposing said means, a second elastic-fluid-pressure-actuated motor reinforcing said means, valve mechanism operated by the resultant of the pressures of the condition-responsive means and both of said motors, said valve mechanism including inlet and exhaust valves closed when in neutral position, said valve mechanism determining an elastic-fluid-pressure imposed on said motors for moving said valves to neutral position, a first conduit connecting said valve mechanism to said first motor, a one-to-one relay having a plurality of pressure chambers and constructed so that the pressure in one of said chambers controls said relay and the pressure in another of said chambers varies so as to equal the pressure in said one chamber, an inlet and an outlet each having a portion of restricted cross section communicating with said other chamber of said relay, a second conduit connecting said valve mechanism to said one chamber of said relay, an adjustable restriction in said second conduit between said one chamber of said relay and said valve mechanism, and a third unrestricted conduit having a cross section greater than the cross section of the restricted portion of said inlet and of said outlet and connecting said other chamber of said relay to said second elastic-fluid-pressure-actuated motor.

7. An elastic-fluid-pressure-operated controller including, a force-exerting condition-responsive means, a spring opposing said means, an elastic-fluid-pressure-operated negative-feedback motor assisting said spring in opposing said means, an elastic-fluid-pressure-operated positive-feedback motor opposing said spring in assisting said means, valve means operated by said condition-responsive means for controlling an elastic-fluid-pressure, said motors being constructed and arranged to adjust said controller by an amount substantially equivalent to the variation in the condition to which said condition-responsive means responds, a one-to-one elastic-fluid-pressure-actuated relay having a control chamber and a controlled chamber, an inlet and an outlet each having a portion of restricted cross section and communicating with said controlled chamber of said relay, a conduit connecting said valve means to said control chamber of said relay, a throttling-range-adjusting restriction in said conduit, and a second unrestricted conduit of greater cross section than the cross section of the restricted portion of said inlet and of said outlet and connecting said controlled chamber of said relay to said positive-feedback motor.

8. An elastic-fluid-pressure-operated controller having a plurality of parts fastened together to form a casing, a first chamber in said casing having a movable wall and adapted to receive a fluid pressure proportional to the set point of the controller, a second chamber in said casing having a movable wall and adapted to receive a fluid pressure proportional to the measured variable governing said controller, a third chamber in said casing having a movable wall and adapted to receive a fluid pressure proportional to any difference between the set point pressure and the measured variable pressure, a fourth chamber in said casing having inlet and outlet valves communicating therewith and connected under the control of the movable wall of said third chamber so that the pressure in said fourth chamber is in amplified proportion to the pressure in said third chamber, a fifth chamber in said casing having a movable wall, a conduit connecting said fourth chamber to said fifth chamber, negative-feedback pressure in said fifth chamber opposing the measured variable pressure in said second chamber, a one-to-one relay having a control chamber and a controlled chamber having in communication therewith an inlet and an exhaust for fluid each having a portion of restricted cross section, the pressure in said controlled chamber being controlled by the pressure in said control chamber, a conduit of small capacity for fluid connecting said fourth chamber to said control chamber, a restriction in said conduit adjustable to vary the throttling range of said controller, a sixth chamber in said casing having a movable wall, and an unrestricted conduit having a cross section greater than the cross section of the restricted portion of said inlet and of said exhaust and connected to said controlled chamber and to said sixth chamber, positive feedback pressure in said controlled chamber and in said sixth chamber, the movable wall of said sixth chamber applying this positive-feedback pressure, in the same direction as the measured variable pressure in said second chamber.

9. An elastic-fluid-pressure-operated controller having a plurality of parts fastened together to form a casing, a first chamber in said casing having a movable wall and adapted to receive a fluid pressure proportional to the set point of the controller, a second chamber in said casing having a movable wall and adapted to receive a fluid pressure proportional to the measured variable governing said controller, a third chamber in said casing having a movable wall and adapted to receive a fluid pressure proportional to any difference between the set point pressure and the measured variable pressure, a fourth chamber in said casing having inlet and outlet valves communicating therewith and connected under the control of the movable wall of said third chamber so that the pressure in said fourth chamber is in amplified proportion to the pressure in said third chamber, a fifth chamber in said casing having a movable wall, a conduit connecting said fourth chamber and said fifth chamber, negative feedback pressure in said fifth chamber opposing the measured variable pressure in said second chamber, a one-to-one relay having a control chamber and a controlled chamber having an inlet and an exhaust for fluid each having a portion of restricted cross section and communicating with said controlled chamber and having a diaphragm exposed to the pressure in said control chamber and in said controlled chamber and causing the pressure in controlled chamber to tend to equal the pressure in said control chamber, a conduit between said fourth chamber and said control chamber, a sixth chamber in said casing having a movable wall, an unrestricted conduit having a cross section greater than the cross section of the restricted portion of said inlet and of said exhaust between said controlled chamber and said sixth chamber, positive feedback pressure in said controlled chamber and in said sixth chamber, the movable wall of said sixth chamber applying this positive-feedback pressure in the same direction as the measured variable pressure in said second chamber, and an adjustable restriction in the conduit between said fourth chamber and said control chamber to give throttling-band adjustment to said controller.

10. In an elastic-fluid-pressure-operated controller, a conduit having a small capacity for fluid, valve means connected to said conduit and operable in one sense in response to variations in a measured variable to admit or exhaust fluid to or from said conduit, a negative-feedback elastic-fluid-operated motor connected to said valve so as to operate it in the opposite sense that it is operated by said measured variable, a positive-feedback elastic-fluid-pressure-operated motor connected to said valve means so as to operate it in the same sense as it is operated by said measured variable, a one-to-one relay having a motor chamber connected to said conduit and having an output chamber in unobstructed communication with said positive-feedback motor and having an inlet and an exhaust for elastic-fluid communicating with said output chamber and each having a portion of restricted cross section, the cross section of said unobstructed communication being greater than the cross section of the restricted portion of said inlet and of said exhaust, and a restriction in said conduit between said valve means and said motor chamber of said one-to-one relay, said restriction being manually adjustable to change the proportional band of said controller.

References Cited in the file of this patent

UNITED STATES PATENTS

| | | |
|---|---|---|
| 2,301,301 | Mallory | Nov. 10, 1942 |
| 2,481,395 | Carns | Sept. 6, 1949 |
| 2,517,051 | Swenson | Aug. 1, 1950 |
| 2,638,911 | Griswold et al. | May 19, 1953 |

OTHER REFERENCES

Moore Products Co., Philadelphia, Pa. Nullmatic Controller Instructions 505–S, 1948, pages 2–7, 11, 23. (Copy in Div. 30.)